Patented Apr. 20, 1948

2,440,201

UNITED STATES PATENT OFFICE 2,440,201

FIRE-RESISTANT CELLULOSE ESTERS AND ETHERS

Joseph H. Klaber, Conshohocken, and Johan Bjorksten, Philadelphia, Pa., assignors to Quaker Chemical Products Corp., Conshohocken, Pa.

No Drawing. Application December 23, 1944, Serial No. 569,642

12 Claims. (Cl. 106—194)

This application is a continuation in part of our co-pending application, Serial No. 491,418, filed June 18, 1943 (now abandoned), and relates to plastic compositions and to filaments or articles made therefrom; more specifically to modified cellulose ester and ether materials.

An object of the invention is to impart to cellulose ester compositions and to articles made therefrom an unusual degree of resistance to fire.

Another object is to provide cellulose acetate compositions more easily extruded, pressed or molded, and having a high degree of thermoplasticity.

Another object is to provide new and useful chemical compositions.

Further objects will become apparent as the following detailed description proceeds.

Heretofore cellulose ester compositions have been used in diverse types of film, such as motion picture films, or transparent wrapping materials, in filaments, and fabrics produced therefrom; in molded and extruded products of various kinds, and the like. While cellulose acetate is considerably more fire-proof than the highly flammable cellulose nitrate, the fire resistance of cellulose acetate has still been insufficient for many purposes, and the same applies to the other plastic cellulose esters and ethers.

Particularly in various military applications calling for a light or transparent plastic, e. g. in parachute fabrics, airplane parts and the like, an increased fireproofness is highly desirable, and frequently essential. The present invention furnishes a novel means for attaining such fireproofness.

According to this invention we modify the cellulose esters and ethers by the addition of a suitable amount of a chemical characterized by compatibility with the cellulose derivatives considered, and by the property of imparting fire resistance to these specific materials.

Among the most suitable of these chemicals are low molecular weight organic or inorganic thiocyanate derivatives, such as ammonium thiocyanate, amine thiocyanates, and the like. Numerous substitution, condensation or other derivatives of these materials were found suitable, others unsuitable. These compounds, as stated, are characterized by their compatibility with the cellulose derivatives, and in the product of the invention they are present dissolved therein.

The suitability of any material can be readily determined by the simple test of fusing it with the proportion contemplated of cellulose acetate, pouring the mixture onto a glass plate, to form a thin film, and testing it with a match for fireproofness. If the film shows more resistance to combustion than does similarly produced film of cellulose acetate then the derivative tested is suitable as a fire-retarding agent for acetyl cellulose fabrics and for other cellulose ester and ether products.

Every material which met this test was found suitable, at least to an appreciable degree, for the purposes of the invention.

The manner in which the fireproofing composition is incorporated in the cellulose derivative, is not material to this invention.

In one of the most common applications, we dissolve ammonium thiocyanate in a solution of cellulose acetate, from which the plastic is then spun, cast, molded or extruded or the like. One per cent of ammonium thiocyanate on the dry matter in the film or filament will clearly retard its combustion. One and one-half per cent of this ingredient will make the cellulose ester or ether still more slow burning. A film containing two per cent of the ammonium thiocyanate burned only partly, and the flames were extinguished spontaneously.

The other derivatives of ammonium thiocyanates and amine thiocyanates are generally not preferred, since they are more costly, and a higher percentage of them will be necessary to accomplish the result. However, these derivatives could be employed to achieve similar results and for the purpose of this invention are considered somewhat less practical equivalents to the ammonium thiocyanate.

Five per cent or more of ammonium thiocyanate on the weight of the cellulose ester rendered the composition entirely non-burning. Much larger amounts may be included, even up to ten per cent or more, but this generally does not offer any additional advantage in fireproofness.

The invention is illustrated by the following examples:

Example 1

| | Parts by weight |
|---|---|
| Cellulose acetate | 94.9 |
| Ammonium thiocyanate | 5.1 | were dissolved in 400 parts by weight of dry acetone. From this solution a thin film was cast on glass. After drying, the film was clear and did not support combustion. This film had a melting point about 60 degrees C. lower than that of a film of the cellulose acetate alone.

Example 2

| | Parts by weight |
|---|---|
| Cellulose acetate | 93 |
| Ammonium thiocyanate | 7 | were dissolved in dry acetone. A thin film cast from this solution was clear and would not support combustion. The melting point of the cellulose acetate was lowered about 60 degrees C. The solution could be spun to form continuous rayon filaments.

Example 3

| | Parts by weight |
|---|---|
| Cellulose propionate | 90 |
| Ammonium thiocyanate | .9 | were dissolved in 1800 parts by weight of dry acetone. A film cast from this solution was clear and showed clearly retarded burning.

Example 4

As Example 3 except that ethyl cellulose was used instead of the cellulose propionate.

Example 5

| | Parts by weight |
|---|---|
| Cellulose propionate | 90 |
| Methyl amine thiocyanate | 10 | were dissolved in a mixture of 400 parts of acetone, 50 parts of ethyl acetate and 5 parts of methanol. A film cast from this solution was clear and fire resistant.

Example 6

100 parts of cellulose acetate was warmed to its fusion point and 4 parts by weight of ammonium thiocyanate were incorporated by mixing. The resulting composition was found suitable for molding and extrusion, and was highly fire resistant.

Example 7

| | Parts by weight |
|---|---|
| Ethyl cellulose (grade "N-22") | 20 |
| Ammonium thiocyanate | 2 |
| Acetone | 100 | were intermixed, so as to form a clear solution. This was cast to form a film, which was tested and found to be fire resistant.

Example 8

| | Parts by weight |
|---|---|
| Cellulose acetate | 100 |
| Ammonium thiocyanate | 5 | were dissolved in 400 parts by weight of dry acetone. One part by weight of ferric chloride was dissolved in this solution. A thin film cast from this solution was clear, bright red in color, and did not support combustion. The solution, upon partial evaporation to suitable consistency, was spun to form rayon-type fibers, and these were found to be entirely fire resistant.

Example 9

A stock solution was made by dissolving 100 parts by weight of cellulose acetate and 5 parts by weight of ammonium thiocyanate in 400 parts of dry acetone. As separate experiments various metallic salts were added to parts of this solution, giving films of varying hue. The results of these tests are given in the following table. The first column lists the number of parts by weight of metallic salt added to 505 parts by weight of the stock solution. The second column identifies the salt, and the third column describes the color of the film obtained:

| Parts by weight | Salt | Color |
|---|---|---|
| 1 | Cupric Chloride | Red. |
| 1 | Cobaltic Chloride | Blue. |
| 1 | Nickel Chloride | Yellow. |
| .9 | Cobalt Chloride | Dark Blue. |
| .1 | Ferric Chloride | |
| .5 | Cobalt Chloride | Red-Violet. |
| .5 | Ferric Chloride | |

None of the above films would support combustion. In the above examples the cupric, cobaltic, nickel and ferric thiocyanates respectively act as coloring media and the color effect could be obtained by incorporating these directly in the compound. However, by forming them in the mix as described above, the desired effect and degree of dispersions are obtained most readily and advantageously.

The presence of the solvent is not essential to the invention and a composition having the desired properties of reduced flammability, increased plasticity and color is obtainable by melting together the ingredients stated, even in the absence of solvent, and in the presence or absence of such other ingredients as plasticizers, fillers, pigments, mold lubricants, and the like. Such compositions may be useful in molding, or forming, and as ingredients for example in paints, varnishes, lacquers and the like. If no color is desired in the composition, some free fatty acid may be advantageously incorporated, in any amount compatible with the other ingredients present.

Obviously any kind of solid articles may be fashioned from the compositions disclosed, but the principal application envisioned is the continuous production of longitudinally extended articles, such as cast sheets made on a conveyor or filaments suitable for textile purposes, made by extrusion.

From the viewpoint of flame resistance and of applications here envisioned, cast films and extruded filaments are equivalent, because if a filament were extended sidewise it would be a film and, if the film were made extremely narrow, it would be a filament. The behaviour of films and filaments in the present invention is therefore essentially the same.

While particular reference has been made to acetone in the examples, it is understood that any volatile solvent can be used, such as for example other low boiling ketones, such as dibutyl ketone, methyl ethyl ketone and the like, esters such as ethyl acetate, butyl acetate and the like, and combinations of such solvents which may also contain compatible amounts of alcohols, hydrocarbons, etc. Since the solvents evaporate, their selection is irrelevant to the fire resistance characteristics of the residual film. Usually, the solution will contain at least about 5% of the film-forming agent, namely, the cellulose ether or ester.

It is fully realized that the invention is capable of wide variations. The above examples have been given only to illustrate, and are not to be construed in any sense of limitation whatever. The invention is to be restricted only by the following claims, in which it is intended to cover all the novelty inherent in the invention, as broadly as possible in view of the prior art.

Having thus disclosed our invention, we claim:

1. A plastic cellulosic composition in solid form comprising a solid cellulosic derivative selected from the group consisting of cellulose esters and cellulose ethers, and between about 1% and about 10% ammonium thiocyanate dissolved in solid solution in and distributed uniformly through said solid cellulosic derivative to impart fire-resistance thereto.

2. The product of claim 1, wherein the cellulosic derivative is cellulose acetate.

3. The product of claim 1, wherein the cellulosic derivative is ethyl cellulose.

4. As an article of manufacture, a longitudinally extended plastic cellulosic body in solid form, comprising as principal effective ingredients a solid cellulosic derivative selected from the group consisting of cellulose esters and cellulose ethers, and between about 1% and about 10% ammonium thiocyanate dissolved in solid solution in and distributed uniformly through said solid cellulosic derivative to impart fire-resistance thereto.

5. The product of claim 4, wherein the said cellulosic body is a cast film.

6. The product of claim 4, wherein the said cellulosic body is an extruded cylindrical article.

7. A colored plastic cellulosic composition in solid form comprising a solid cellulosic derivative selected from the group consisting of cellulose ethers and cellulose esters, between about 1% and about 10% ammonium thiocyanate dissolved in solid solution in and distributed uniformly through said solid cellulosic derivative to impart fire-resistance thereto and a coloring quantity of a colored metal thiocyanate.

8. The product of claim 7, wherein the solid cellulosic derivative is cellulose acetate.

9. The product of claim 7, wherein the solid cellulosic derivative is ethyl cellulose.

10. A plastic cellulosic composition in solid form comprising a solid cellulosic derivative selected from the group consisting of cellulose esters and cellulose ethers, and between about 5% and about 10% ammonium thiocyanate dissolved in solid solution in and distributed uniformly through said solid cellulosic derivative to impart fire-resistance thereto.

11. The product of claim 10, wherein the cellulosic derivative is cellulose acetate.

12. The product of claim 10, wherein the cellulosic derivative is ethyl cellulose.

JOSEPH H. KLABER.
JOHAN BJORKSTEN.

REFERENCES CITED

The following references are of record in the file of this patent:

UNITED STATES PATENTS

| Number | Name | Date |
|---|---|---|
| 894,108 | Bettrisy | July 21, 1908 |
| 1,594,201 | Horan | July 27, 1926 |
| 1,622,368 | Chavassien | Mar. 29, 1927 |
| 2,052,557 | Dreyfus | Sept. 1, 1936 |
| 2,086,419 | Hunt et al. | July 6, 1937 |
| 381,487 | Cook | Aug. 7, 1945 |

FOREIGN PATENTS

| Number | Country | Date |
|---|---|---|
| 117,970 | Switzerland | Dec. 1, 1926 |